United States Patent Office 2,784,234
Patented Mar. 5, 1957

2,784,234

8-OXO AND 8-HYDROXY DERIVATIVES OF 1-ACETYL - 10a,12a - DIMETHYLTETRADECAHYDROCHRYSENES

Raymond M. Dodson, Park Ridge, Ill., assignor, by mesne assignments, to G. D. Searle & Co., Skokie, Ill., a corporation of Delaware No Drawing. Application December 26, 1952,
Serial No. 328,150

3 Claims. (Cl. 260—586)

The present invention relates to the preparation of a new group of unsaturated 1-acetyl-10a,12a-dimethyl-tetradecahydrochrysenes. Of special interest are the tetradecahydrochrysenes which can be represented by the general structural formulas

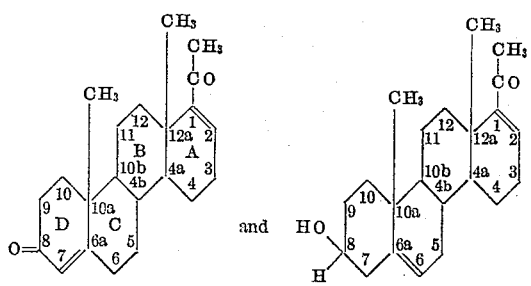

The compounds of this invention are useful in the treatment of gonadal hormonal imbalance. Further they are valuable as intermediates in the organic synthesis of other hormonal agents. Thus treatment of a 1-acetyl-10a,12a-dimethyl - 3,4,4a,4b,5,7,8,9,10,10a,10b,11,12,12a-tetradecahydrochrysen-8-ol with hydrogen peroxide and sodium hydroxide yields an epoxide, which, on Oppenauer oxidation yields the 1-acetyl-1,2-epoxy-10a,12a-dimethyl-1,2,3,4,4a,4b,5,6,8,9,10,10a,10b,11,12,12a-hexadecahydrochrysen-8-one, which on treatment with hydrogen bromide and then with Raney nickel yields 1-acetyl-1-hydroxy-10a,12a-dimethyl-1,2,3,4,4a,4b,5,6,8,9,10,10a,10b,-11,12,12a-hexadecahydrochrysen-8-one, a luteoid agent. Perfusion of such a 1-hydroxy derivative through mammalian adrenal glands yields valuable hydroxy derivatives with adrenocorticoid activity of the neoglycogenetic type.

The process for the preparation of the compounds claimed herein comprises the acid catalyzed isomerization of a 1-ethynyl-1-hydroxypolyhydrochrysene nuclearly saturated in ring A, which has a ring A structure.

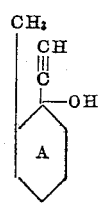

This isomerization is carried out most conveniently by heating at about 25–100° C. with strong formic acid although other strong acidic reagents such as a mixture of sulfuric and acetic acid also accomplish this objective. The reaction apparently proceeds through a dehydration stage followed by a rehydration stage although this mechanism has not been established with certainty. The proposed mechanism can be represented structurally as follows:

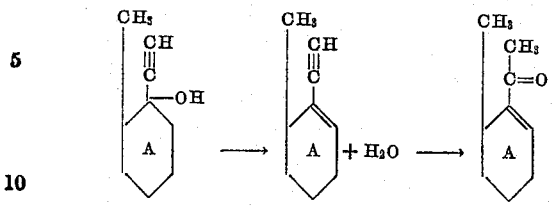

The following examples illustrate in detail certain of the procedures used in the practice of this invention. However the invention is not to be construed as limited thereby in spirit or in scope since it is obvious to those skilled in the art that many modifications in materials and methods may be practiced without departing from the invention. In these examples temperatures are given in degrees centigrade (° C.) and relative amounts of material in parts by weight.

Example 1

720 parts of anhydrous ether are saturated with acetylene and treated with stirring under anhydrous conditions with a solution of 7.3 parts of 8-hydroxy-10a,12a-dimethyl-1,2,3,4,4a,4b,5,7,8,9,10,10a,10b,11,12,12a-hexadecahydrochrysen-1-one in 720 parts of anhydrous ether and 220 parts of anhydrous benzene and then in the course of 50 minutes with a suspension prepared by dissolving 11 parts of potassium in 240 parts of dry tertiary amyl alcohol. Acetylene is bubbled into the solution during the addition and for 4 more hours after which the solution is shaken with 1000 parts of a saturated solution of ammonium chloride containing 24 parts of concentrated hydrochloric acid. The aqueous layer is separated and extracted exhaustively with ether. The combined organic layers are dried and evaporated in vacuo leaving as a residue the 1-ethynyl-10a,12a-dimethyl-1,2,3,4,-4a,4b,5,7,8,9,10,10a,10b,11,12,12a-hexadecahydrochrysen-1,8-diol which, recrystallized from benzene and then from methanol, melts at about 248–251° C.

One part of this ethynyl compound is treated with 500 parts of 90% formic acid and then heated on the steam bath for an hour. The reaction mixture is poured into water and the product is collected on a filter. In order to hydrolyze the 8-formyloxy radical to the free hydroxy compound, the mixture is then dissolved in 100 parts of a 5% ethanolic potassium hydroxide solution and allowed to stand for 45 minutes at room temperature. The resulting solution is acidified with dilute acetic acid and diluted with water. The precipitate is collected on a filter, taken up in a 9:1 mixture of benzene and ethyl acetate and thus applied to a column of silica gel. Elution with a 9:1 mixture of benzene and ethyl acetate and removal of the solvents from the eluate by vacuum distillation yields the 1-acetyl-10a,12a-dimethyl-3,4,4a,4b,5,-7,8,9,10,10a,10b,11,12,12a - tetradecahydrochysen - 8 - ol melting at about 222–225° C. The ultraviolet spectrum of the compound in methanol shows a maximum at 233 millimicrons. The compound has the structural formula

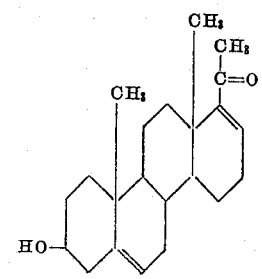

Example 2

A solution of 6.51 parts of 1-ethynyl-10a,12a-dimethyl - 1,2,3,4,4a,4b,5,7,8,9,10,10a,10b,11,12,12a - hexadecahydrochrysen-1,8-diol in 180 parts of anhydrous toluene is treated with a solution of 5 parts of aluminum isopropoxide in 22 parts of toluene. After addition of 40 parts of cyclohexanone, the resulting solution is heated under reflux for 100 minutes. The aluminum isopropoxide is then hydrolyzed by the addition of 300 parts of a saturated solution of sodium potassium tartrate and the cyclohexanone is removed by steam distillation. The product is collected on a filter and dissolved in 285 parts of boiling dioxane. After addition of 400 parts of water and cooling, the 1-ethynyl-1-hydroxy-10a,12-dimethyl-hexadecahydrochrysen-8-one is collected on a filter. Recrystallization from dilute dioxane raises the melting point to 281-284° C. If it is reasonable to assume that the nuclear double bond has shifted into conjugation with the oxo group, the major product can be assigned the structural formula

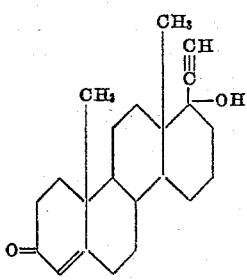

Example 3

A solution of one part of this compound in 600 parts of 80% formic acid is heated under reflux for 3 hours, poured into water and ether extracted. This extract is dried over anhydrous sodium sulfate, decolorized with charcoal, filtered and concentrated in vacuo. The residue is recrystallized successively from petroleum ether, dilute acetone and dilute methanol. The resulting 1-acetyl - 10a,12a - dimethyltetradecahydrochrysen - 8-one melts at about 173-174° C. Its ultraviolet absorption spectrum shows a maximum at 237 mμ with a molecular extinction coefficient of 25,300. If the assumption regarding the position of the double bond attached to the carbon in the 6a-position is correct the following formula can be assigned to the principal product

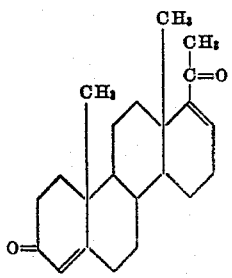

Example 4

A suspension prepared from 25 parts of mercuric oxide, 50 parts of concentrated sulfuric acid, 300 parts of water and 600 parts of methanol is heated to 60° C. and then treated with a solution of 3 parts of the 1-ethynyl - 1 - hydroxy - 10a,-12a - dimethylhexadecahydrochrysen-8-one of Example 2 in a mixture of 100 parts of dioxane and 160 parts of methanol. The resulting suspension is stirred and heated at 50° C. for 6 hours, after which it is treated with 150 parts of anhydrous potassium carbonate and stirred for 30 minutes. The mixture is filtered and the material collected on the filter is washed with water and then suspended in water. This suspension is rendered weakly acid by addition of acetic acid and then saturated with hydrogen sulfide. The precipitate is collected on a filter, dried and extracted with boiling chloroform. This extract is evaporated and the residue is applied to a chromatography column containing 80 parts of silica gel. The product is eluted with a 9:1 mixture of benzene and ethyl acetate and crystallized from methanol. A mixture of this substance with the 1-acetyl-10a,12a-dimethyltetradecahydrochrysen-8-one obtained in the preceding example shows no depression in melting point.

Example 5

A suspension of 25 parts of the 1-ethynyl-1-hydroxy-10a,12a - dimethylhexadecahydrochrysen - 8 - one of Example 2 and 186 parts of p-toluenesulfonamido mercury in 8000 parts of 96% ethanol is heated at reflux for 4 days. The resulting suspension is then made basic with 88 parts of concentrated ammonium hydroxide and then saturated with hydrogen sulfide. The solvent is evaporated and the residue extracted twice with 7500-part portions of chloroform. The chloroform extract is filtered and evaporated. The residue is treated with ethyl acetate and the resulting solution separated from a small amount of insoluble starting material by filtration. The ethyl acetate solution is washed with ice cold 2-N potassium hydroxide and then with water to neutrality. After drying over sodium sulfate the solution is concentrated in vacuo. The residue is dissolved in benzene and applied to a chromatography column containing 1500 parts of silica gel. The column is eluted with four 9000-part portions of a mixture containing 90% benzene and 10% ethyl acetate. Concentration yields the 1-acetyl-10a,12a-dimethyltetradecahydrochrysen - 8 - one. A particularly pure preparation is obtained by concentration of the second eluate under vacuum and crystallization of the residue from dilute methanol, the crystals melting at about 172-174° C. The compound is identical with that of the preceding example.

I claim:

1. A member of the class consisting of 1 - acetyl-10a,12a - dimethyl - 3,4,4a,4b,5,7,8,9,10,10a,10b,11,12,-12a - tetradecahydrochrysen - 8 - ol and 1 - acetyl-10a,12a - dimethyl - 3,4,4a,4b,5,6,8,9,10,10a,10b,11,12,-12a-tetradecahydrochrysen-8-one.

2. 1 - acetyl - 10a,12a - dimethyl - 3,4,4a,4b,5,7,8,9,-10,10a,10b,11,12,12a-tetradecahydrochrysen-8-ol.

3. 1 - acetyl - 10a,12a - dimethyl - 3,4,4a,4b,5,6,8,9,-10,10a10b,11,12,12a-tetradecahydrochrysen-8-one.

References Cited in the file of this patent

UNITED STATES PATENTS

| 2,334,291 | Ruzicka et al. | Nov. 16, 1943 |
| 2,351,637 | Ruzicka et al. | June 20, 1944 |
| 2,614,123 | Newman et al. | Oct. 14, 1952 |

OTHER REFERENCES

Chanley: J. A. C. S., vol. 70, 1948, page 244.